Patented June 17, 1947

2,422,215

UNITED STATES PATENT OFFICE 2,422,215

METHOD OF VITREOUS COATING REFRACTORY MATERIAL

Charles R. Amberg, Alfred, N. Y., and Harold C. Harrison, Portland, Oreg., assignors to The Exolon Company, Blasdell, N. Y., a corporation of Massachusetts No Drawing. Application May 12, 1942, Serial No. 442,599½

9 Claims. (Cl. 117—54)

This invention relates to wetting agents, and relates more particularly to the utilization of certain metallic substances as high temperature wetting agents to produce improved ceramic glazes and bonds for refractory and abrasive articles made from certain refractory materials.

We have discovered that molybdenum and certain other metals and their compounds possess the property of enhancing the ability of ceramic glazes and bonds to wet the surface of graphite, carbon, silicon carbide and fused alumina. The term "graphite" is used herein as including not only natural, crystalline graphite but also artificial graphite, whether crystalline or non-crystalline, and the term "carbon" is used herein to mean non-graphitic, amorphous carbon. The extreme difficulty of wetting graphite, carbon and silicon carbide with such ceramic materials has long been recognized, and has been a serious obstacle in the production of satisfactory glazes and bonds therefor. While fused alumina is not so difficult to wet, our new wetting agents enable this to be accomplished more readily and effectively than has been possible heretofore. Our wetting agents cause the ceramic glaze or bond to flow or spread more readily over the surface of the refractory particles and thus afford a more even coating, resulting in glazes which give better protection against oxidation and in stronger bonds than those hitherto obtainable.

As will be described in detail below, we have made practical application of our discovery to improving the production of surface ceramic glazes for refractory articles made from refractory mixes containing graphite or silicon carbide or both, and the production of ceramic bonds for refractory and abrasive articles made from silicon carbide and for abrasive articles made from fused alumina. We have also demonstrated the ability of our wetting agents to improve the wetting of carbon by ceramic materials at high temperatures, as will be discussed hereinafter.

After discovering the effectiveness of molybdenum, we tested many other elements which it was thought, from a consideration of their known properties, might display a similar wetting action. Tungsten was found to be substantially as effective as molybdenum, and uranium was also satisfactory, although less effective, while vanadium displayed some useful wetting effects and may be considered a border line case. Phosphorus gave erratic indications of wetting agent properties, but would in any event be undesirable in a crucible because it might contaminate the melt. Molybdenum, tungsten and uranium are all found in the A group of group VI of the periodic table of elements. It might be expected that chromium, which is likewise found in that group, would display similar wetting properties, but this is not the case, nor are the other elements of group VI effective.

It is frequently advantageous to use our new wetting agents in the form of metallic compounds, preferably soluble salts such as sodium or ammonium molybdate, tungstate, uranate or vanadate, as will be presently described. The compound should be one which, in the presence of the other constituents employed, will not volatilize at the processing temperature. For this reason, molybdenum tri-oxide, which sublimes at 795° C., does not give as good results as other molybdenum compounds, although it is usable. We have successfully used molybdenum as a metallic addition to the refractory body in the form of ferro-molybdenum, as described in detail hereinafter. Although we have not yet tried them, there is every reason to believe that metallic tungsten, uranium and vanadium could be similarly used, since, in other embodiments of our invention, we have found the compounds of these metals to act similarly to the corresponding compounds of molybdenum.

We shall now describe the specific application of our wetting agents to various illustrative glazing and bonding processes in which graphite, silicon carbide and fused alumina refractory materials are employed.

Buck Patent 2,013,625, issued September 3, 1935, discloses self-glazing carbon bonded refractory articles, in which the glaze-forming constituents include certain powdered metals or metalloids dispersed throughout the refractory body, the preferred powdered material being a ferro-manganese silicon alloy. The refractory body may include graphite and silicon carbide grain or other refractory materials, and the crucible or other refractory article is formed and the carbon bond developed by a carbonizing burn in the usual manner. The protective glaze may then be developed on the surface of the refractory article by a rapid, high temperature, oxidizing firing or glost fires. The ferro-manganese silicon at the surface of the article oxidizes during this second firing and forms a ferro-manganese silicate glaze, thus protecting the remainder of the body against oxidation.

We have found that glazes of the type described in said Buck patent may be greatly improved, with remarkable lengthening of the service life of the refractory article, by incorporating molybdenum in the refractory body. The addition to the refractory body mix of 0.25% by weight of ferro-molybdenum containing 60% molybdenum produces excellent results. Larger additions of molybdenum, up to as high as 5% of ferro-molybdenum, develop increasingly improved glazes, but the cost becomes uneconomic. The ferro-molybdenum, in powdered form, may be added to the refractory mix at the same time and in the same manner as the powdered ferro-manganese silicon, in the proportion of one-quarter of a pound to each 100 pounds of the mix customarily employed prior to our invention. The molybdenum acts as a wetting agent, causing the glaze produced during the glost fire to spread more evenly over and adhere more effectively to the surface of the finished refractory article, and also enabling reduction of the time necessary for glazing during the glost fire.

Instead of incorporating metallic molybdenum in the refractory mix, the refractory article formed and bonded in the usual manner of the Buck patent, may be dipped in a water solution of a soluble molybdate. Spraying or painting with the wetting agent solution is equally effective. A 10% solution of sodium molybdate is satisfactory. In the case of ammonium molybdate, a more concentrated solution is preferable, such as a solution saturated at room temperature. After dipping, the article is air dried and then subjected to the glost fire. The glaze produced in this manner is superior to that obtained by the use of metallic molybdenum in the refractory body, but the latter has the advantage when the self-glazing property is utilized to replace glaze which has been chipped or worn away in service.

A solution of a soluble tungstate may be used in lieu of the molybdate solutions as just described with equally good results. Uranate solutions, while less effective than those of molybdates or tungstates, nevertheless show a substantially improved glaze as compared to one obtained without using our wetting agents. Sodium vanadate solution somewhat improves the glaze obtainable on those refractory mixes that are relatively easy to glaze by prior methods, but is not sufficiently effective to give a truly satisfactory glaze on bodies that are difficult to glaze by prior methods.

Refractory articles containing silicon carbide grain manufactured in accordance with the Buck patent have usually employed the silicon carbide in the form of settling tank fines, which are 200 mesh and finer, due to the increasing difficulty of obtaining a satisfactory glaze with larger silicon carbide grain sizes. By the use of our wetting agents as described above, however, it is possible to produce satisfactory glazes on refractory articles made with 150 mesh silicon carbide grain or mixtures containing larger sizes of silicon carbide grain together with some settling tank fines. On the other hand, even with our wetting agents, it remains true that the self-glazing iron-manganese refractory bodies are more easily glazed if their silicon carbide content be entirely in the form of settling tank fines.

Our wetting agents are also applicable to the production of external boro-silicate glazes on refractory articles. A well known process for the production of glazes of this type on carbon bonded graphite refractory articles is disclosed in Farrish Patent 1,658,406, issued February 7, 1928, and a modification thereof is described in Diamond Patent 1,828,767, issued October 27, 1931. In the processes of these patents, a suitable graphite refractory mix is molded to the desired shape, subjected to a carbonizing burn to develop the carbon bond, and then, while still hot, treated with a borax glazing solution, after which the article is given a glost fire. Our wetting agents may be used with advantageous results in such processes in several ways, illustrations of which will now be given.

According to one embodiment of our invention, our wetting agents may be applied to the carbonized refractory articles in the form of a surface application as a separate step between the carbonizing burn and the treatment with the glazing solution. The carbonized refractory articles are permitted to cool after the carbonizing burn, and one of our wetting agents then applied. For example, the cooled refractory article may be dipped in a concentrated solution of sodium molybdate or other soluble salt of our wetting agents, and then air dried. Or the surface of the refractory article may be painted with a suspension of an insoluble salt, such as ferric molybdate suspended in Goulac (sulphite liquor pitch) or other organic adhesive, such as dextrin. The refractory article may then be raised to a red heat, plunged hot into a turgid borax solution, and thereafter subjected to a glost fire at, say, 2600° F. By the expression a "turgid borax solution," is meant a saturated solution containing grains of undissolved borax suspended by agitation of the solution.

In another and preferred embodiment, our wetting agents may be incorporated in the borax glazing solution, for example, by adding 10% by weight of sodium molybdate to the turgid borax solution above described. We prefer, however, also to incorporate in the glazing solution the free silica which is necessary for the formation of the boro-silicate glaze. Where the glazing solution contains only borax, it is necessary that some free silica, say in the form of sand or flint, be included in the refractory mix, in order to form the boro-silicate glaze, and this requirement is not satisfied by the presence of clay. The presence of free silica in the refractory body is undesirable from the standpoint of thermal shock resistance. By the use of a glazing solution comprising free silica in addition to water, borax and one of our wetting agents, we entirely obviate this drawback. We have also found it unnecessary to use a turgid borax solution, a glazing solution containing no undissolved borax, such as the one described below, being entirely satisfactory.

A suitable formula in accordance with our invention for a glazing solution for producing a boro-silicate glaze on refractory articles is (all parts being by weight):

| | Parts |
|---|---|
| Water | 500 |
| Borax | 40 |
| Sodium molybdate | 10 |
| Potter's flint | 40 |

A suitable refractory mix containing no free silica is:

| | Parts |
|---|---|
| Madagascar graphite | 30 |
| Fire clay grog | 20 |
| Silicon carbide | 30 |
| Tar | 7 |
| Pitch | 13 |

The refractory articles may be molded and given a carbonizing burn in the usual manner, then plunged while red hot into the above glazing solution, left in the solution until boiling ceases, removed, allowed to steam dry, and then flash fired to 2600° F. The glazing solution must be kept agitated prior to the dipping treatment, in order to keep the insoluble flint in suspension. The boiling resulting from the immersion of the hot article produces adequate agitation during dipping. The glaze thus produced is only fair, having a texture somewhat like that of orange peel, with small beads and ridges of glaze and with the refractory body showing in pinhole spots between the ridges and beads. We therefore prefer to employ a second dip in the glazing solution and a second glost fire. To save a re-heating, this may be done by again plunging the refractory articles in the glazing solution while still red hot from the first glost fire. The second dip and fire plugs the pinholes above described and results in a smooth protective glaze covering the body completely.

The glaze resulting from the foregoing two-dip process is thinner, smoother and gives more complete coverage of the refractory article than the glazes usually produced by the processes of the Farrish and Diamond patents. Not only is the life of the refractory articles thereby increased, but, as pointed out above, the omission of free silica from the refractory mix gives better thermal shock resistance.

With the external boro-silicate glaze made in accordance with our invention as above described, we have found that refractory articles containing coarser sizes of silicon carbide grain glaze equally as well as those containing silicon carbide settling tank fines. We have successfully thus glazed refractory articles made with the silicon carbide grade known as "50 and finer," which is capable of passing through a 50 mesh screen. It will be recognized by those skilled in this art that this is an important advantage. The contrary result obtained with the internal or self-glazing ferro-manganese silicate glaze is probably due to the fact that, with the self-glazing types, the silicon carbide of the refractory mix as well as the graphite must burn away in the surface layer before the glaze can form. This is apparently not essential with the external boro-silicate glaze.

Our wetting agents are not limited in their usefulness to the particular internal and external glazes described above, nor to carbon bonded refractory articles. Although the optimum conditions of use may differ for different glazes and for different refractory mixes, and may have to be determined in particular cases by experimentation, our wetting agents appear to be helpful to a greater or less degree in all processes of forming glazes on refractory articles made of graphite and silicon carbide. We have successfully used our wetting agents in the several ways described above in connection with various types of external glazes on both carbon bonded and clay bonded refractory articles containing graphite and silicon carbide. Various external ceramic glazes for such refractory articles are in use, and the glaze obtained therewith may be improved by employing a dip treatment with a solution of one of our wetting agents either before or after dipping the formed and burned refractory article in the glazing material, the subsequent glaze firing being carried out in the customary manner.

Another important field of usefulness for our wetting agents is in the manufacture of silicon carbide and fused alumina ceramic bonded abrasive articles. Here the purpose is to improve and strengthen the bond between the particles of abrasive grain, and hence the wetting agent should be incorporated in the abrasive mix from which the wheel or other abrasive article is to be formed. We have found that an addition of 0.5% by weight of ferro-molybdenum containing 60% molybdenum to a typical silicon carbide abrasive mix will increase the modulus of rupture of the finished abrasive from 450 to 700 pounds per square inch, and that the same addition to a typical fused alumina abrasive mix will increase the modulus of rupture of the finished abrasive from 1190 to 1300 pounds per square inch, these figures being averages for ten samples, and the lower figure in each case being for exactly the same material with exactly the same treatment except for omission of the ferro-molybdenum. The silicon carbide samples were bonded with feldspar and kaolin, and the fused alumina samples were bonded with slip and ball clays. The increase in strength is due to better wetting of the abrasive grain by the bond, the increase being more marked in the case of the more difficultly wet material, silicon carbide.

As might be expected from the foregoing, the resistance to oxidation of silicon carbide ceramic bonded refractories can also be substantially increased by the use of our wetting agents. For this purpose, we have found that an addition of 0.25% by weight of ferro-molybdenum to the mix will produce effective results.

So far as we are aware, no satisfactory methods were known prior to our invention for producing ceramic glazes directly on carbon refractories. Such glazed carbon refractories as are commercially available are usually made by first producing an adherent layer of silicon carbide on the surface of the formed carbon refractory, and then glazing the silicon surface with a ceramic glaze. Our wetting agents may be advantageously used in such processes but they also offer the possibility of directly glazing the carbon refractory article itself. However, the prior glazing methods hereinabove described do not produce truly satisfactory ceramic glazes on refractory articles made from carbon, as distinguished from graphite, even with our wetting agents.

A wetting agent is commonly defined as a material which is capable of dissolving in a liquid and lowering the surface tension thereof. The term "wetting agent" is used in this specification and in the appended claims in the foregoing sense. The ceramic glazes or bonds to which this invention pertains are silicates which are applied in a molten or partially molten condition and their effectiveness depends upon the ease and completeness with which, in that condition, they wet the surfaces to be glazed or bonded. Such silicate melts have a high surface tension and hence do not satisfactorily wet the surfaces of difficultly wet materials such as graphite, carbon, silicon carbide and fused alumina. The wetting agents of the present invention are certain metals and compounds thereof which are soluble in the silicate melt, either in their initial form or in the form which they assume at the temperature of fusion of the silicate melt, and which have the property of lowering the surface tension of the silicate melt sufficiently to enable it more effectively to wet graphite, carbon, silicon and fused alumina. The wetting agent can be introduced into the silicate melt by incorporating it with the silicates to be melted, by incorporating it with the body to be wetted by the melt, or by applying it to the surface to be wetted by the melt. The reduction in surface tension enhances the ability of the silicate melt to wet the surfaces of the solid materials specified, and causes the silicate melt to spread evenly thereover and to adhere tightly thereto, thus providing a better glaze or bond.

Refractory and abrasive articles of the types referred to in this specification are composed of grains of refractory material. A ceramic glaze coats the surfaces of the grains located at or near the exterior surfaces of the article and serve to protect them from outside influences, whereas a ceramic bond coats the surfaces of the grains composing the body of the article and serves to join or bond the grains together to form the article. Either a ceramic glaze or a ceramic bond may correctly be described as a ceramic coating. The term ceramic coating is used in the appended claims to include both ceramic glazes and ceramic bonds.

Although we have thus described our invention with particularity and in the best modes that we know how to practice it, it is to be understood that various changes and modifications may be made by those skilled in the art without departing from the spirit of the invention. We desire to be limited, therefore, only by the scope of the appended claims.

We claim:

1. The method of producing a ceramic coating on a difficultly wettable refractory material of the group consisting of graphite, silicon carbide, fused alumina and mixtures thereof, which comprises fusing on the surfaces of grains of said difficultly wettable material, a silicate melt capable of forming a ceramic coating on said grains, and said silicate melt having dissolved therein during said fusion a small proportion of a wetting agent to reduce the surface tension of said melt with respect to said grains of difficultly wettable material, said wetting agent being a member of the group consisting of molybdenum, tungsten, uranium and vanadium and their compounds.

2. The method as claimed in claim 1, in which said ceramic coating is a self-glazing ferro-manganese-silicate glaze, and in which said wetting agent is molybdenum incorporated in a mix from which a refractory article is to be formed, said mix comprising said difficultly wettable material and iron, manganese and silicon in addition to said molybdenum, and in which said fusion of the silicate melt is effected by firing the formed article.

3. The method as claimed in claim 1, in which said ceramic coating is a ferro-manganese-silicate glaze, and in which a formed and burned refractory article comprising said difficultly wettable material and iron, manganese and silicon is coated with said wetting agent in the form of a salt, and in which said fusion of the silicate melt is thereafter effected by subjecting the article to a glost fire.

4. The method as claimed in claim 1, in which said wetting agent is a salt and is applied as a coating on a formed and burned refractory article comprising said difficultly wettable material prior to said fusion of the silicate melt.

5. The method as claimed in claim 1, in which said wetting agent is a water soluble salt of molybdenum and is applied as a coating on a formed and burned refractory article comprising said difficultly wettable material by wetting said article with a water solution of said salt prior to said fusion of the silicate melt.

6. The method as claimed in claim 1, in which said ceramic coating is a boro-silicate glaze, and in which a formed and burned refractory article comprising said difficultly wettable material is wet with a water solution containing borax and said wetting agent in the form of a water soluble salt, and in which said fusion of the silicate melt is thereafter effected by subjecting the article to a glost fire.

7. The method as claimed in claim 1, in which said ceramic coating is a boro-silicate glaze, and in which a formed and burned refractory article comprising said difficultly wettable material is dipped while hot into a water solution containing borax, free silica in suspension and said wetting agent in the form of a water soluble salt, and in which said fusion of the silicate melt is thereafter effected by subjecting the article to a glost fire.

8. The method as claimed in claim 1, in which said ceramic coating is a bond for an abrasive article comprising silicon carbide, and in which said wetting agent is molybdenum incorporated in the mix from which the abrasive article is formed.

9. The method as claimed in claim 1, in which said ceramic coating is a bond for an abrasive article comprising fused alumina, and in which said wetting agent is molybdenum incorporated in the mix from which the abrasive article is formed.

CHARLES R. AMBERG.
HAROLD C. HARRISON.

REFERENCES CITED

The following references are of record in the file of this patent:

UNITED STATES PATENTS

| Number | Name | Date |
|---|---|---|
| 2,118,795 | Littleton | May 24, 1938 |
| 2,154,387 | Sleeman | Apr. 11, 1939 |
| 2,230,267 | Ruben | Feb. 4, 1941 |
| 1,249,637 | Keyes | Dec. 11, 1917 |
| 2,293,146 | Kautz | Aug. 18, 1942 |
| 2,294,760 | Morris | Sept. 1, 1942 |

FOREIGN PATENTS

| Number | Country | Date |
|---|---|---|
| 456,602 | Great Britain | Nov. 12, 1936 |